(12) United States Patent
Morris, Jr. et al.

(10) Patent No.: US 6,684,010 B1
(45) Date of Patent: Jan. 27, 2004

(54) WAVELENGTH COMPENSATED OPTICAL WAVELENGTH DIVISION COUPLER AND ASSOCIATED METHODS

(75) Inventors: James E. Morris, Jr., Charlotte, NC (US); Michael R. Feldman, Charlotte, NC (US)

(73) Assignee: Digital Optics Corp., Charlotte, NC (US)

( * ) Notice: Subject to any disclaimer, the term of this patent is extended or adjusted under 35 U.S.C. 154(b) by 225 days.

(21) Appl. No.: 09/749,773

(22) Filed: Dec. 28, 2000

Related U.S. Application Data
(60) Provisional application No. 60/186,666, filed on Mar. 3, 2000.

(51) Int. Cl.[7] .................................................. G02B 6/42
(52) U.S. Cl. ............................. 385/39; 385/24; 385/39
(58) Field of Search ....................................... 385/24, 39

(56) References Cited

U.S. PATENT DOCUMENTS

| | | | |
|---|---|---|---|
| 4,244,045 A | * | 1/1981 | Nosu et al. .................... 370/3 |
| 4,741,588 A | * | 5/1988 | Nicia et al. .............. 350/96.19 |
| 5,526,338 A | * | 6/1996 | Hasman et al. ............. 369/109 |
| 5,835,517 A | | 11/1998 | Jayaraman et al. |
| 5,963,684 A | * | 10/1999 | Ford et al. ..................... 385/24 |
| 6,404,958 B1 | * | 6/2002 | Boye et al. .................... 385/47 |

FOREIGN PATENT DOCUMENTS

| | | |
|---|---|---|
| EP | 0394865 A2 | 10/1990 |
| FR | 2539518 A1 | 1/1983 |
| GB | 2014752 | 8/1979 |
| WO | WO 9918612 | 4/1999 |
| WO | WO 01/09657 A1 | 2/2001 |
| WO | WO 01/14921 A1 | 3/2001 |

\* cited by examiner

*Primary Examiner*—Phan T. H. Palmer
*Assistant Examiner*—Jennifer Doan
(74) *Attorney, Agent, or Firm*—Susan S. Morse

(57) ABSTRACT

A coupler having fewer individual parts improves manufacturability and scalability. The coupler includes a wavelength selective filter, a first port for propagating at least a first wavelength, a second port for propagating at least a second wavelength different from the first wavelength, and a third port for propagating at least the first wavelength and the second wavelength. The three ports are positioned relative to the wavelength selective filter. At least two individual optical elements are also included in the coupler. Each optical element is associated with one of the three ports, between an associated port and the wavelength selective filter. All optical elements needed for directing light between the ports and the wavelength selective filter are provided on at least one of a substrate and substrates bonded thereto.

36 Claims, 4 Drawing Sheets

WAVELENGTH COMPENSATED OPTICAL WAVELENGTH DIVISION COUPLER AND ASSOCIATED METHODS

CROSS REFERENCE TO RELATED APPLICATIONS

The present invention claims priority under 35 U.S.C. §119(e) to commonly assigned U.S. Provisional Application Ser. No. 60/186,666 entitled "Wavelength Compensated Optical Wavelength Division Coupler and Associated Methods" filed Mar. 3, 2000, the entire contents of which are hereby incorporated by reference in their entirety for all purposes.

BACKGROUND OF THE INVENTION

1. Field of the Invention

The present invention is directed to a wavelength compensated optical wavelength division coupler, more particularly to an integrated coupler.

2. Description of Related Art

Optical multipexers/demultiplexers are generally known in the art. See, for example, U.S. Pat. No. 4,244,045 entitled "Optical Multiplexer and Demultiplexer", which is hereby incorporated by reference in its entirety for all purposes. In the configurations set forth therein, the mux/demux includes a plurality of filters for the respective wavelengths, a corresponding plurality of prisms for providing the filtered light from/to a corresponding plurality of sources/detectors and a corresponding plurality of elements for collimating/condensing light. The multiplex path that either receives or supplies the multiplexed light includes a prism and an element for condensing/collimating light.

As can be seen in the '045 patent, a plurality of narrow band pass filters are required, one for each of the channels. To multiplex a plurality of channels requires a plurality of narrow band-pass (NBP) filters connected in series such that the output of one filter provides part of the input to another. This serial connection typically requires a critical off-axis alignment that must be precisely controlled. As shown in the '045 patent, this involves introducing a light beam at a desired incident angle using the lens and the prism. Since each of the multiple beams required a different incident angle, different prisms are used for each beam. These prisms are very small, making them difficult to manufacture and making further reduction in size of the multiplexer impractical. Another example of such adjustment includes fixing the NBP filters and then adjusting the location of the ports for the input and output of light to thereby control the angle of incidence on the filter. Since each beam requires different angles, and thus different prisms, in using these configurations for multiple beams, very small different prisms are required.

Attention has been focused on eliminating these small parts and separate filters. One solution involves using linear variable filters, as set forth in U.S. Pat. No. 5,583,683 entitled "Optical Multiplexing Device" to Scobey. The device disclosed therein is a parallel optical block having a filter of varying thickness on at least one side thereof. The light is incident on the block at the same tilt angle, but due to the varying thickness of the filter, different wavelengths are transmitted at each port, with the remaining wavelengths being reflected, again creating the zigzag pattern of the '045 patent. However, thickness control is difficult to reliably achieve and the control of the input tilt angle is also critical. Another solution involves using a wedge-shaped optical block with the filter on at least one side thereof. The wedged shaped optical block used therein results in the sequentially reflected light beams striking the wavelength selective filter at different angles.

However, even these integral filter element solutions still require precise control of either filter thickness or wedge profile. Further, the number of channels to be practically multiplexed by the variable filter thickness is limited by process control and to be practically multiplexed by the wedge shaped due to the increased length needed to accommodate many channels. Therefore, while these configurations may overcome some of the attendant problems of numerous separate filters, they still require expensive angular alignments.

SUMMARY OF THE PRESENT INVENTION

The present invention is therefore directed to an integrated coupler that substantially overcomes one or more of the problems due to the limitations and disadvantages of the related art.

It is an object of the present invention to create a multiplexer having fewer individual parts, thereby improving manufacturability and scalability.

At least one of these and other objects may be realized by providing an optical device including a wavelength selective filter, a first port for propagating at least a first wavelength, a second port for propagating at least a second wavelength different from the first wavelength, a third port for propagating at least the first wavelength and the second wavelength, and at least two individual optical elements, each optical element being associated with one of the ports, between an associated port and the wavelength selective filter, wherein all optical elements needed for directing light between the ports and the wavelength selective filter are provided on at least one of a substrate and substrates bonded thereto. All three ports are positioned relative to the wavelength selective filter.

The wavelength selective filter and the at least two optical elements may be integrated on a wafer level. The wavelength selective filter may be a multi-layer dielectric stack formed on one of the substrates. The bonding of substrates may occur at a wafer level, and the bonded substrates are diced to form the optical device. The at least two optical elements may be formed lithographically.

The at least two optical elements may be diffractive elements. The diffractive elements may have a same deflection grating. The at least two diffractive elements may include at least three diffractive elements. The diffractive elements may perform both deflection and collimation. The at least two optical elements may be refractive elements. The refractive elements may be off-axis refractive elements. The at least two optical elements may include a pair of optical elements. The pair of optical elements may include a refractive element and a diffractive element. All optical elements may be provided on a single substrate. The at least two optical elements may be provided on a same surface.

The optical device may include light sources adjacent to substrates on which optical elements are formed. The optical device may include power monitors for the light sources. The at least two optical elements may deflect a portion of the light from each of the light sources onto a respective power monitor.

At least one of the above and other objects may be realized by providing a diffractive multiple wavelength optical coupler including at least two diffractive elements having a same deflection grating period, each diffractive receiving a substantially monochromatic light beam, a wavelength selective filter for at least one of the at least two diffractive elements, the wavelength selective filter passing a desired wavelength and reflecting all other wavelengths; and a multiplex diffractive receiving a multiplex optical signal. The coupler may serve as a multiplexer or a demultiplexer. The at least two diffractives may include at least three diffractives, wherein a spacing between adjacent diffractives is different from one another.

At least one of the above and other objects of the present invention may be realized by providing a multiple wavelength optical coupler including at least a first, second and third surface on which an optical function is performed, at least two individual optical elements, each individual optical element receiving a substantially monochromatic light beam, the at least two individual optical elements being formed on the first surface, a wavelength selective filter that passes a desired wavelength and reflect all other wavelengths formed on a second surface, the third surface reflecting light incident thereon, and a multiplex optical element receiving a multiplex optical signal.

The coupler may serve as a multiplexer or as a demultiplexer. The individual optical elements may be refractive elements and/or diffractive elements. The at least two individual optical elements may include at least three individual optical elements, wherein a spacing between adjacent individual optical elements is different from one another.

At least one of the above and other objects may be realized by providing a multiple wavelength optical coupler including at least three separate optical elements, each individual optical element receiving a substantially monochromatic light beam, wherein each separate optical element outputs light at a different deflection angle and a spacing between adjacent individual optical elements is different from one another, a plurality of wavelength selective filters, a wavelength filter being provided for at least two of the three separate optical elements, each wavelength selective filter passing a desired wavelength and reflecting all other wavelengths, and a multiplex optical element receiving a multiplex optical signal. The coupler may serve as a multiplexer or as a demultiplexer. The separate optical elements may be refractive elements and/or diffractive elements.

At least one of the above and other objects may be realized by providing a method of coupling multiple wavelengths including receiving a plurality of substantially monochromatic light beams at a corresponding plurality of ports, each port receiving a monochromatic light beam of a different wavelength, providing an optical element at each port, each optical elements outputting light at a particular deflection angle, wavelength selectively filtering at each non-terminal port, the filtering including passing the substantially monochromatic light beam associated with the port and substantially reflecting all other wavelengths, directing the substantially monochromatic light beams between the optical elements and a multiplex port, and receiving a multiplex optical signal at a multiplex port. The providing may include, when there are at least three optical elements, spacing adjacent optical elements differently from one another. The optical elements may output light at the same or different, unique deflection angles.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which.

DETAILED DESCRIPTION OF PREFERRED EMBODIMENTS

Since filters are readily available in sheets and other optical elements are readily produced on the wafer level, it is practical to provide the optical elements on a separate surface from the filters. While individual diffractive elements, off-axis refractive elements, or combination of diffractive and on-axis refractive elements could be provided or formed on the filter itself, to substitute for the prisms in the above related configurations, this often does not result in the most scaleable, manufacturable configuration. Further, reflective surfaces are still needed to transfer the light beams to/from the multiplexed signal. Therefore, it is often convenient to provide at least three surfaces on which the optical elements, including the reflector, and the filters may be provided. One method for forming more than two surfaces on which to provide at least one optical element is set forth, for example, in U.S. Pat. No. 6,096,155, which is hereby incorporated by reference in its entirety for all purposes. As used herein, "wafer level" is to mean any production of multiple optical systems that are subsequently diced for final use.

Figure 1:
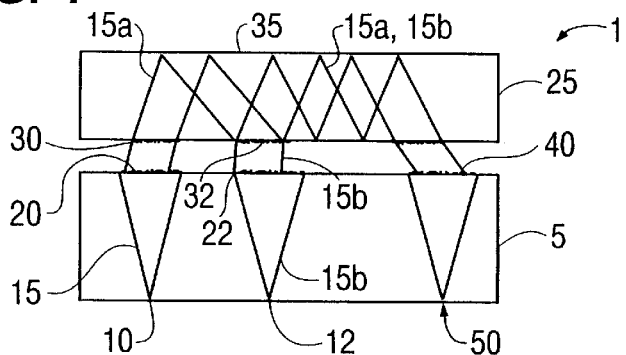
FIG. 1 is a schematic cross-sectional view of a multiplexer using different single wavelength channel diffractives.

A diffractive optical multiple wavelength coupler 1 including two substrates 5, 25 is shown in FIG. 1. Only two separate light paths, each for a particular wavelength of light, are shown for simplicity. Further, while the following explanation assumes the device is operating as a multiplexer, the device could clearly also function as a demultiplexer. Light of different wavelengths is input to respective separate interfaces 10, 12 which direct the light through a substrate 5 to a corresponding individual diffractive 20, 22. Light 15a passing through the diffractive 20 is incident upon a wavelength filter 30, which allows only light at a desired wavelength to pass therethrough. If the light 15a is sufficiently monochromatic for a desired end-use, the wavelength sensitive filter 30 may be eliminated. Light passing through the filter 30 and the substrate 25 is internally reflected at an opposite surface 35 of the substrate 25, either due to total internal reflection or to a reflective coating provided on the opposite surface. Light 15b passing through the diffractive 22 is incident upon a wavelength filter 32. The light 1Sa reflected from the opposite surface 35 is also incident on the wavelength filter 32. Since the wavelength filter 32 transmits the wavelength of light 15b and reflects all other wavelengths, both light 15a and 15b are directed back to the surface 35, where they are reflected to a multiplex diffractive 40. This multiplex diffractive 40 directs the light 15a, 15b through the substrate 5 onto a multiplex interface 50, which, e.g., supplies the multiple wavelengths to a single fiber.

In accordance with conventional design, such as in the prisms of the '045 patent, each of the individual diffractives 20, 22 outputs light therefrom at the same angle. Since diffractives are highly wavelength dependent, this requires a different diffractive grating for each wavelength. However, upon reaching the multiplex diffractive 40, the light output therefrom will not all be collimated and focused on the multiplex interface 50, since the performance of diffractives is highly wavelength dependent. In other words, the light delivered at the same angle to the multiplex diffractive 40 will be output at different angles. Thus, a lot of the light will be lost.

Figure 2:
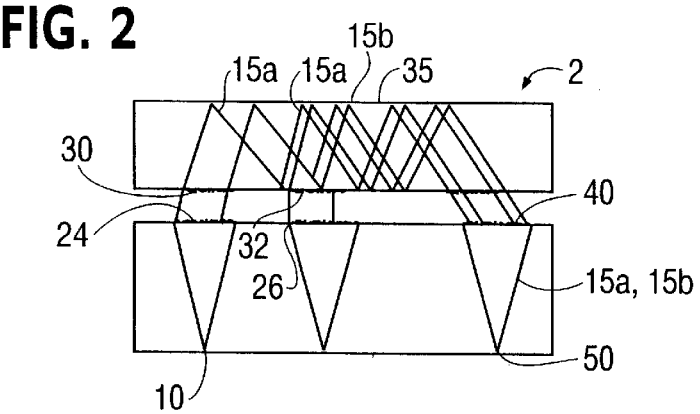
FIG. 2 is a schematic cross-sectional view of a multiplexer using the identical single wavelength channel diffractives.

In accordance with an illustrative embodiment of the present invention, as shown in FIG. 2, a diffractive optical multiple wavelength coupler 2 has individual diffractives 24, 26 which all have the same grating period for deflection. Thus, the combination of the individual diffractives 24, 26 and the multiplex diffractive 40 will be independent of wavelength. In other words, since the individual diffractive 24, 2 will diffract each wavelength differently, light at different wavelengths will reach the multiplex diffractive 40 at different angles. Thus, while light 15a will still be reflected by the opposite surface 35 and directed onto the wavelength filter 32, the light 15a and 15b from the wavelength filter 32 will be traveling at different deflection angles. Since light 15a, 15b of different wavelengths will be incident on the multiplex diffractive at different angles, the multiplex diffractive 40 then will collimate all of the different wavelengths and output them to the multiplex interface 50.

Thus, in accordance with the present invention, each pair of diffractives, i.e., an individual diffractive 24, 26 and the multiplex diffractive 40, acts as an achromatic pair. In other words, the diffractives compensate for one another for differences in wavelengths. Further, even if the wavelength varies from a desired output, the diffractive pair will self-compensate for this shift.

Each diffractive 24, 26, 40 may be a deflection grating plus an on-axis lens. When the lens function is added to the diffractives 24, 26 while the deflection grating remains the same for all lenses, the lens function will be different, resulting in different diffractive structures for the different wavelengths. The lens portion for each diffractive is to be designed for a different focal length so that the multiplex lens 40 focuses the light to the same depth along the z-axis. Alternatively, the lens function of the diffractives 22, 26, 40 may be replaced by a plurality of the same refractive lenses. These refractive lenses are not nearly as wavelength dependent, i.e., have much less chromatic dispersion than diffractive lenses, so the same refractives may be used for the light 15a, 15b. If the refractives are to be positioned where the diffractives are, the diffractives supplying the deflection could be provided on the refractives or on the filters.

The interfaces 10, 12, 50 illustrated in FIGS. 1 and 2 are shown as they would appear if they constituting an optical fiber butt-coupled to the interfaces, with the light diverging therefrom. Alternatively, associated lenses for collimating the light before the interface may be provided, which would result in the fibers being spaced from the interfaces. These associated lenses could be used for separate interfaces 10, 12 and/or multiplex interface 50. Further, the actual light sources may be provided without the use of a fiber or other delivery structure.

Figure 3A:
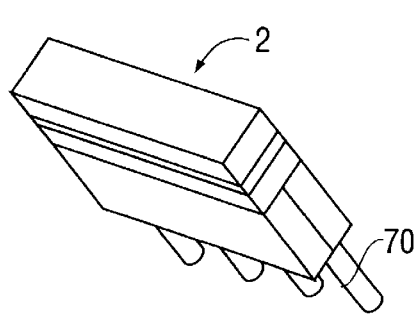
FIG. 3A is an elevational perspective view of a plurality of fibers integrated with a multiplexer.
Figure 3B:
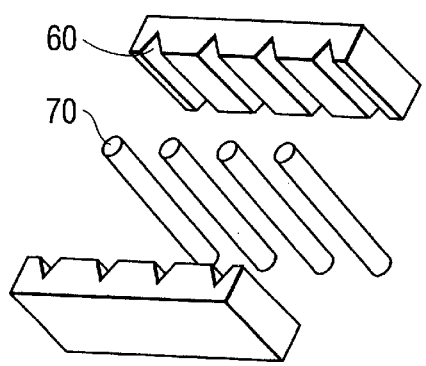
FIG. 3B is an elevational exploded perspective view of a plurality of fibers housed in v-grooves.

When the light is deflected at different angles from the separate diffractives 24, 26, the multiplex diffractive 40 will provide all the light to the multiplex interface 50 at the correct angles, but the position of these beams will be shifted from the center in the x-y direction. One way of compensating for this positional shift is to vary the spacing of the individual lenses 22 and the corresponding filters 30 across the array so that all the beams are incident at the same cross-sectional position on the lens 40. This also will result in varying the position of the separate interfaces 10, which may include varying the position of the corresponding fibers in an array or providing some deflection between a fiber array and the interfaces to have the light thereon properly positioned. Variation in fiber spacing is advantageously provided using v-grooves 60 aligned with the coupler to hold fibers 70 therein, as shown in FIGS. 3a and 3b. V-grooves may also obviously be used in conjunction with a regular array. The fibers in the v-grooves may be aligned with the coupler 2 using passive alignment techniques, such as those set forth in commonly assigned, co-pending PCT Application Serial No. PCT/US00/30431, which is hereby incorporated by reference in its entirety for all purposes.

Figure 4:
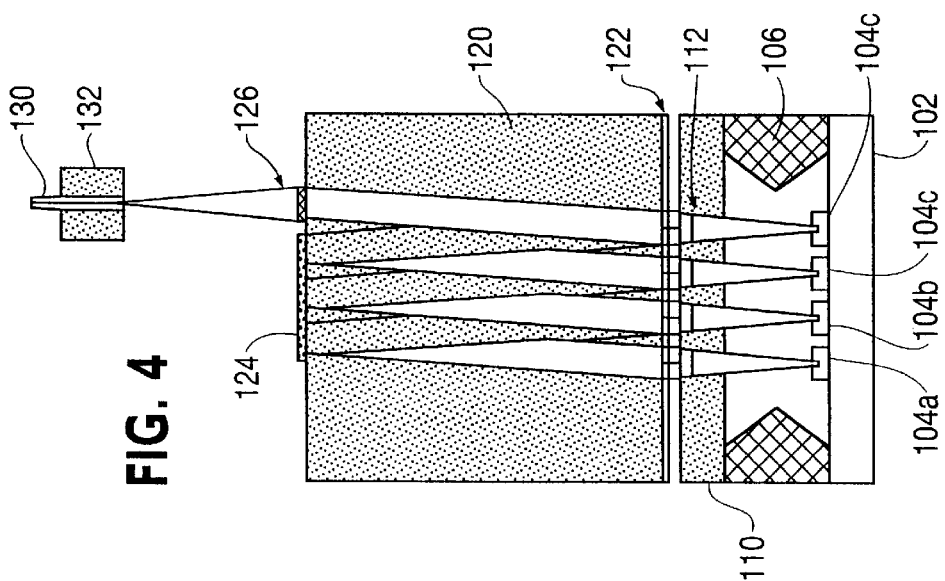
FIG. 4 is detailed schematic cross-section of a multiplexer of the present invention.

A detailed configuration for more than two beams is shown in FIG. 4. FIG. 4 is a schematic cross-section of the multiplexer of the present invention. An array 104 of light sources 104a–104d, here shown as vertical cavity surface emitting lasers (VCSELs), is provided on a substrate 102. Light output by the light source array 104 is directed to a first optics block 110 having a corresponding plurality of collimating/deflecting elements 112. The light source array 104 is separated from the first optics block 110 by a spacer 106, here shown as etched silicon. The collimated/deflected light then hits a corresponding plurality of filters 122, one for each appropriate wavelength of light. The filters 122 are preferably mounted on or formed on a second optics block 120, but may be provided on a separate, intermediate optics block.

The light passing through the filters 122 is directed to an opposite surface of the optics block 120 having a reflective element 124 thereon. In this particular configuration, the opposite side of the optics block 120 also has a focusing/deflecting element 126 thereon for focusing the light onto a fiber 130, which, as shown in FIG. 4, may be housed in an MT-RJ connector 132. The light reflected by the reflective element 124 is directed back toward the input surface of the optics block 120 where it is incident on another filter of the plurality of filters 122. Since each filter will only pass light of a particular wavelength and the light source array 104 has light sources of different wavelengths, all of the filters other than the corresponding filter at the output of the light source will reflect the light back toward the other surface of the optics block 120. Each corresponding filter allows the light from the corresponding light source to pass therethrough to thereby enter the optics block 120.

Figure 5:
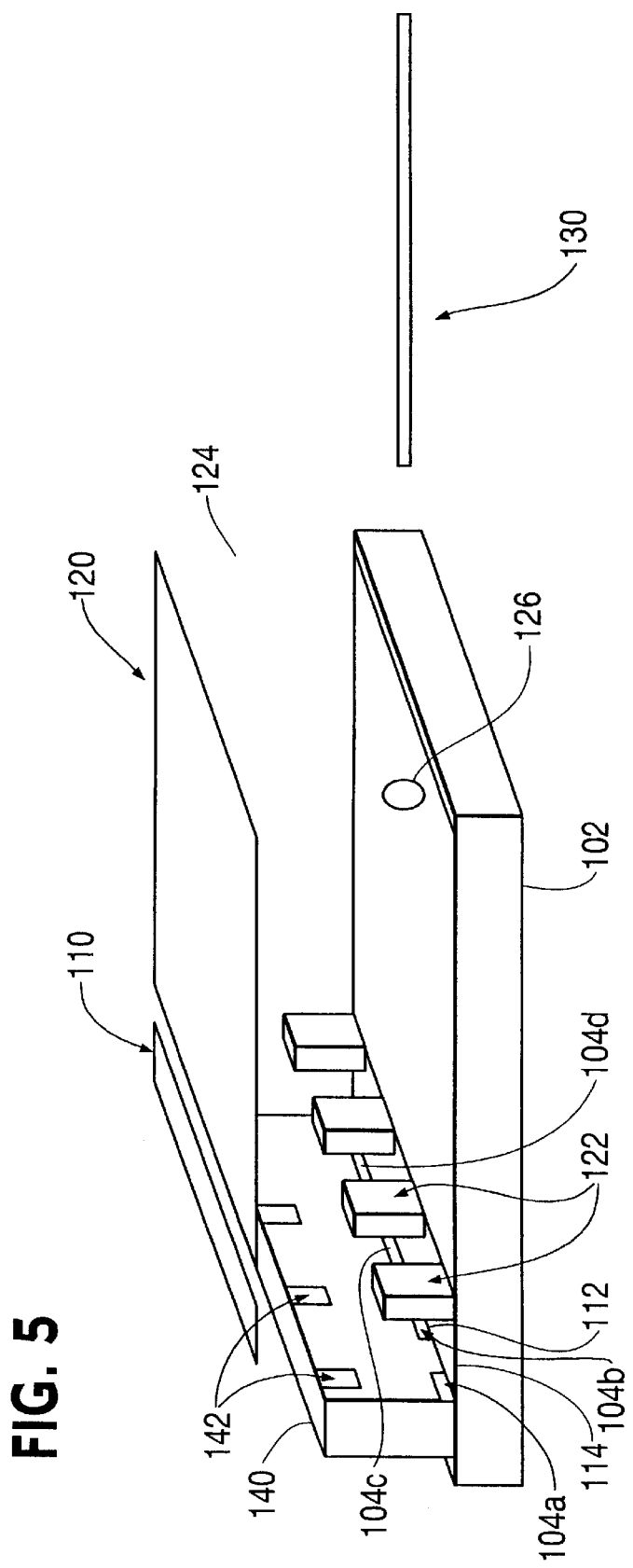
FIG. 5 is a perspective elevational view of the detailed schematic of FIG. 4.

A schematic perspective, elevational view of the multiplexer of FIG. 4 is shown in FIG. 5, along with an array of detectors 142 for monitoring the outputs of the light sources.

In FIG. 5, the light sources 104a–104d are edge emitting light sources, rather than the vertical emitting sources of FIG. 4. For providing light to the detectors 142, the first optics block 110 further includes a plurality of splitting/deflecting elements 114 for splitting off a portion of the light and directing it up and back towards the detectors 142. In this embodiment, the reflective surface 124 on the optics block 120 reflects the split light back to the detectors 142. The rest of the beam that is not split off continues to the collimating/deflecting elements 112 as in FIG. 4. These elements may be combined 112, 114 may be combined. In the particular configuration shown in FIG. 5, the first and second optics blocks 110, 120 are mounted on the same substrate 102 as the light sources 104a–104d, which here are edge-emitting lasers.

Figure 6:
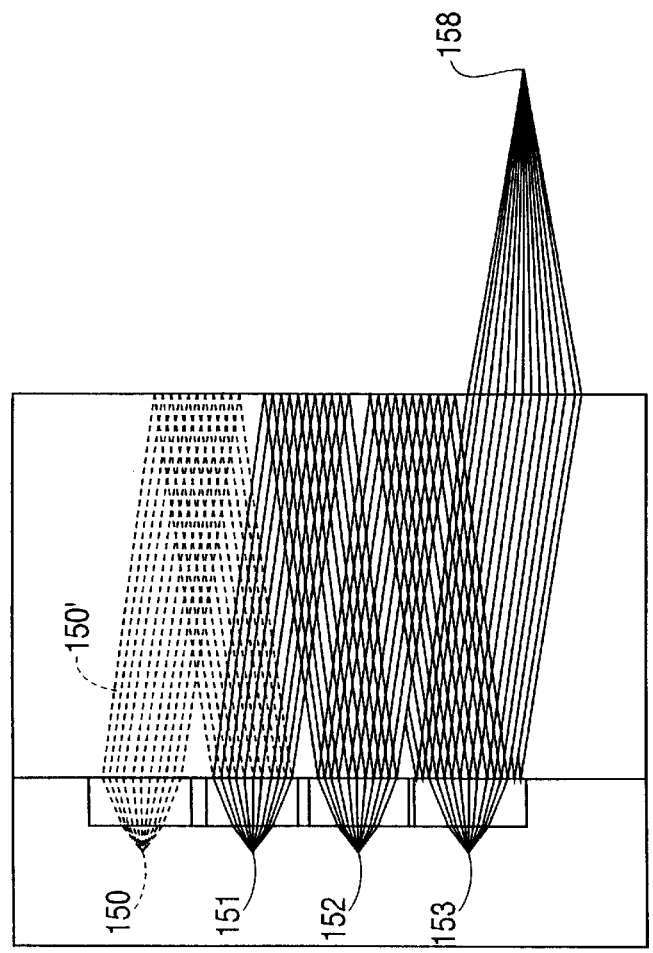
FIG. 6 is a schematic side view of the paths taken by light of different wavelengths through the multiplexer.

FIG. 6 illustrates a side view of the path light will take through the multiplexer. As can be seen therein, light from an edged emitting light source incident at a first port 150 is collimated and deflected. No filter is required at this end of the system, since the wavelength corresponding to the first port is the only wavelength either remaining in or input to the system. Light 151' incident at a second port 151 is also collimated and deflected at a different angle as the light input at the first port. The light 151' is also incident on a filter that transmits light 151' while reflecting light 150'. Similarly, light 152' and 153' incident at third and fourth port 152, 153 respectively, is collimated and deflected at a different angle as the light input at the first and second ports, and from each other. The light 152' is also incident on a filter that transmits light 152' while reflecting light 150', 151', while light 153' is incident on a filter that transmits light 153' while reflecting light 150', 15 1', 152'. Finally, element focuses multiplexed light 154' to a multiplex port 154.

Figure 7A:
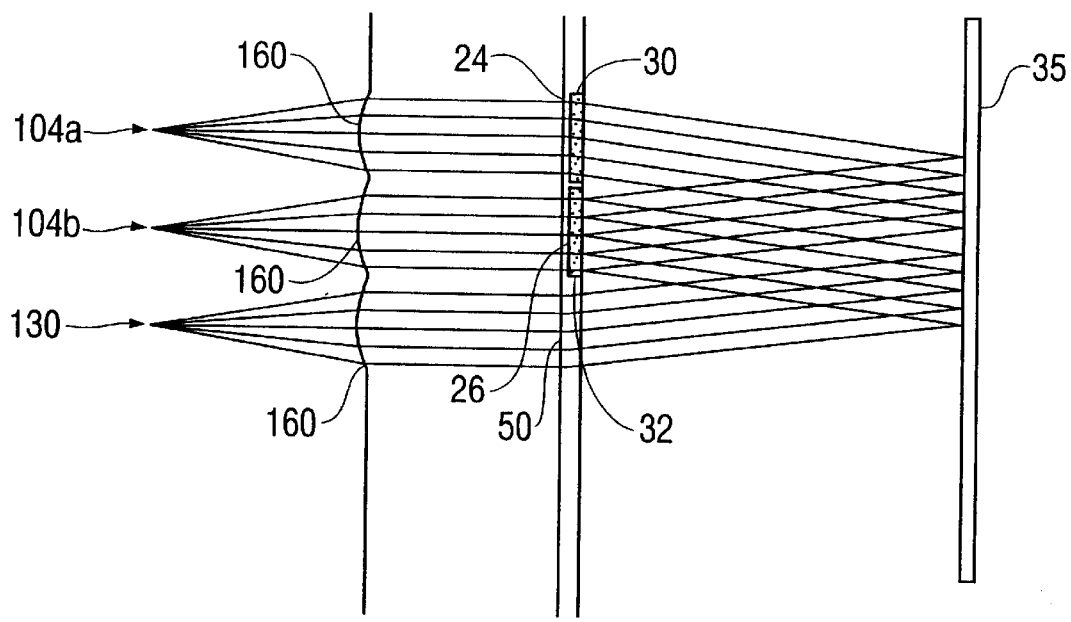
FIG. 7A is a schematic cross-section of a multiplexer of the present invention using refractive elements and diffractive elements.
Figure 7B:
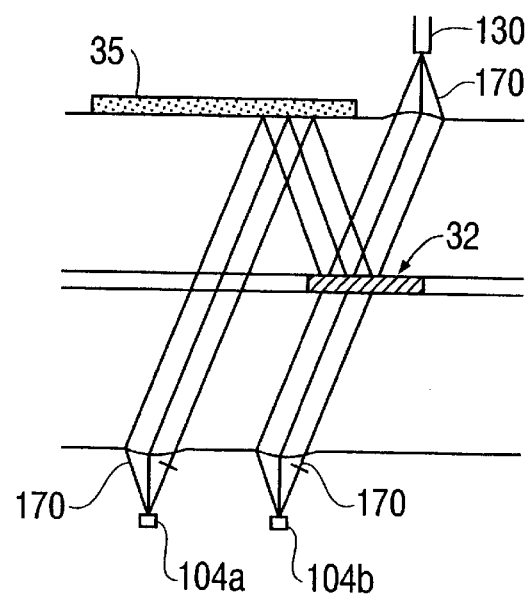
FIG. 7B is a schematic cross-section of a multiplexer of the present invention using off-axis refractive elements.

FIGS. 7A and 7B illustrate refractive embodiments of the present invention. FIG. 7A illustrates a multiplexer using refractive elements 160 for each of the ports. In this configuration, the diffractive elements 24, 26 are the same and serve to provide the deflection angle, which will then be different for the different wavelengths form the light sources 104a, 104b. Otherwise the operation is the same as in FIG. 2. This configuration provides the efficiency of refractive elements for focusing and collimating the beam, while using the difference in deflection angles output from the diffractive elements to reduce the requirements on the wavelength filters.

FIG. 7B is an all refractive configuration in which off-axis refractive elements 170 are used to provide the deflection angle as well as the collimating and focusing. The light at different wavelengths from 104a, 104b output from these off-axis refractives 170 will have the same angle, so the requirements on the wavelength filter 32 are not reduced. However, this configuration is the most efficient regarding the optical power.

Thus, the present invention results in an integrated wavelength compensated coupler that may include a power monitor for the light sources. While the above embodiments have described regarding a multiplexer, it is to be understood that the active elements may instead be detectors, with the multiplex port 154 serving as the input port and first-fourth ports serving as output ports. Further, the wavelength filter at the terminal end is optional.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation. Thus, the scope of the invention should be determined by the appended claims and their legal equivalents, rather than by the examples given.

What is claimed is:

1. An optical device comprising:

a wavelength selective filter;

a first port for propagating at least a first wavelength, said first port being positioned relative to the wavelength selective filter;

a second port for propagating at least a second wavelength different from the first wavelength, said second port positioned relative to the wavelength selective filter;

a third port for propagating at least the first wavelength and the second wavelength, said third port being positioned relative to the wavelength selective filter; and at least two individual diffractive optical elements, each diffractive optical element being associated with one of said ports, between an associated port and the wavelength selective filter, wherein each diffractive optical element outputting light at different angles.

2. The optical device of claim 1, the wavelength selective filter and the at least two optical elements are integrated on a wafer level.

3. The optical device of claim 1, wherein the wavelength selective filter is a multi-layer dielectric stack formed on one of said substrates.

4. The optical device of claim 1, wherein bonding of said substrates occurs at a wafer level, and said bonded substrates are diced to form the optical device.

5. The optical device of claim 1, wherein said at least two optical elements are formed lithographically.

6. The optical device of claim 1, wherein said at least two optical elements are diffractive elements.

7. The optical device of claim 6, wherein said diffractive elements have a same deflection grating.

8. The optical device of claim 6, wherein said at least two diffractive elements include at least three diffractive elements.

9. The optical device of claim 6, wherein said diffractive elements perform both deflection and collimation.

10. The optical device of claim 1, wherein said at least two optical elements are refractive elements.

11. The optical device of claim 10, wherein said refractive elements are off-axis refractive elements.

12. The optical device of claim 1, wherein said at least two optical elements include a pair of optical elements.

13. The optical device of claim 12, wherein said pair of optical elements include a refractive element and a diffractive element.

14. The optical device of claim 1, wherein all optical elements are provided on a single substrate.

15. The optical device of claim 1, wherein said at least two optical elements are provided on a same surface.

16. The optical device of claim 1, further comprising providing light sources adjacent to substrates on which optical elements are formed.

17. The optical device of claim 16, further comprising power monitors for said light sources.

18. The optical device of claim 17, wherein said at least two optical elements deflect a portion of the light from each of the light sources onto a respective power monitor.

19. A diffractive multiple wavelength optical coupler comprising:
- at least two diffractive elements having a same deflection grating period, each diffractive receiving a substantially monochromatic light beam, each diffractive optical element light at different angles;
- a wavelength selective filter for at least one of said at least two diffractive elements, the wavelength selective filter passing a desired wavelength and reflecting all other wavelengths; and
- a multiplex diffractive receiving a multiplex optical signal.

20. The diffractive multiple wavelength optical coupler as in claim 19, wherein said coupler serves as a multiplexer.

21. The diffractive multiple wavelength optical coupler as in claim 19, wherein said coupler serves as a demultiplexer.

22. The diffractive multiple wavelength optical coupler as in claim 19, wherein said at least two diffractives comprise at least three diffractives, wherein a spacing between adjacent diffractives is different from one another.

23. A multiple wavelength optical coupler comprising:
- at least a first, second and third surface on which an optical function is performed;
- at least two individual optical elements, each individual optical element receiving a substantially monochromatic light beam, each individual optical element outputting light at different angles, said at least two individual optical elements being formed on the first surface;
- a wavelength selective filter that passes a desired wavelength and reflect all other wavelengths formed on a second surface;
- the third surface reflecting light incident thereon; and
- a multiplex optical element receiving a multiplex optical signal.

24. The multiple wavelength optical coupler as in claim 23, wherein said coupler serves as a multiplexer.

25. The multiple wavelength optical coupler as in claim 23, wherein said coupler serves as a demultiplexer.

26. The multiple wavelength optical coupler as in claim 23, wherein said individual optical elements are refractive elements.

27. The multiple wavelength optical coupler as in claim 23, wherein said individual optical elements are diffractive elements.

28. The multiple wavelength optical coupler as in claim 23, wherein said at least two individual optical elements comprise at least three individual optical elements, wherein a spacing between adjacent individual optical elements is different from one another.

29. A multiple wavelength optical coupler comprising:
- at least three separate optical elements each individual optical element receiving a substantially monochromatic light beam, wherein each separate optical element outputs light at a different deflection angle and a spacing between adjacent individual optical elements is different from one another;
- a plurality of wavelength selective filters, a wavelength filter being provided for at least two of said three separate optical elements, each wavelength selective filter passing a desired wavelength and reflecting all other wavelengths; and
- a multiplex optical element receiving a multiplex optical signal.

30. The multiple wavelength optical coupler as in claim 29, wherein said coupler serves as a multiplexer.

31. The multiple wavelength optical coupler as in claim 29, wherein said coupler serves as a demultiplexer.

32. The multiple wavelength optical coupler as in claim 29, wherein said separate optical elements are refractive elements.

33. The multiple wavelength optical coupler as in claim 29, wherein said separate optical elements are diffractive elements.

34. A method of coupling multiple wavelengths comprising:
- receiving a plurality of substantially monochromatic light beams at a corresponding plurality of ports, each port receiving a monochromatic light beam of a different wavelength;
- providing an optical element at each port, each optical element outputting light at a different deflection angle;
- wavelength selectively filtering at each non-terminal port, said filtering including passing the substantially monochromatic light beam associated with the port and substantially reflecting all other wavelengths;
- directing the substantially monochromatic light beams between the optical elements and a multiplex port; and
- receiving a multiplex optical signal at a multiplex port.

35. The method of claim 34, where said providing includes, when there are at least three optical elements, spacing adjacent optical elements differently from one another.

36. The method of claim 34, wherein said optical elements output light at the same deflection angle.

* * * * *